June 1, 1926.

Re. 16,358

J. E. FITZGIBBON

REVERSIBLE TOP HOSE

Original Filed May 3, 1924

INVENTOR
John E. Fitzgibbon
BY
Warren S. Orton
ATTORNEY

Reissued June 1, 1926.

Re. 16,358

UNITED STATES PATENT OFFICE.

JOHN E. FITZGIBBON, OF MILWAUKEE, WISCONSIN, ASSIGNOR TO PHOENIX HOSIERY COMPANY, A CORPORATION OF WISCONSIN.

REVERSIBLE-TOP HOSE.

Original No. 1,529,123, dated March 10, 1925, Serial No. 710,734, filed May 3, 1924. Application for reissue filed March 23, 1926. Serial No. 96,891.

The invention relates to a stocking of the type which is designed to be rolled down from the top to form rolled top hose or folded down to form turnover top hose.

Stockings intended to be used in this way are usually of shorter length than the conventional stockings which are designed to extend over the wearer's knees, are usually made of some high grade material such as silk or other pleasing fabric and the garter band or top is usually of two ply material. It has been known in stocking manufacture to make the inside ply of this band of a material different from the material used in forming the major portion of the stocking and this inner ply is frequently made of cotton, of a mixture of silk and cotton, or of some similar inexpensive and strong material. It is appreciated that when this cotton top stocking is rolled down to form the desired roll top stocking, the inner cotton ply forms the outside of the roll and detracts from the pleasing appearance of the rolled stocking as a whole. Should both plies be made of the light, frail silk or silk-like material forming the major portion of the stocking, the roll would be difficult to form and would not present the desired pleasing ring-like construction due to lack of sufficient body in the material forming the desired character or roll.

Accordingly, the primary object of the invention is to provide a simple form of garter top band which will provide sufficient weight of material to facilitate the forming of the roll and at the same time provide a pleasing appearance on the outside of the roll when formed.

Another object of the invention is to provide a roll top stocking of the type outlined which will feature economy in the materials used and at the same time provide adequate strength in the roll to meet service requirement at this portion of the stocking.

Various other objects and advantages of the invention will be in part obvious from an inspection of the accompanying drawings and in part will be more fully set forth in the following particular description of one form of stocking embodying my invention.

Figure 1:
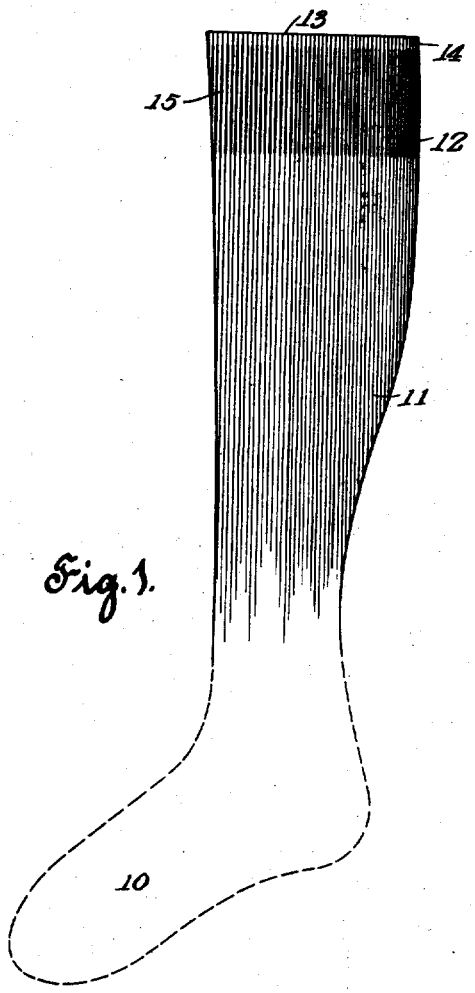
Figure 2:
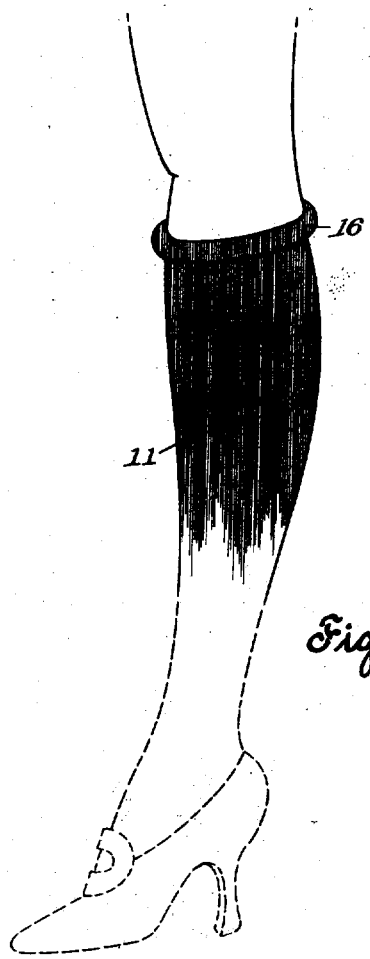

In the accompanying drawings:

Fig. 1 is a plan view of a stocking embodying a preferred embodiment of the invention and with the stocking in its normally distended or unrolled position, and Fig. 2 is a similar view of the stocking in Fig. 1 with the top rolled down to form a rolled top stocking.

In the following description and in the claims, parts will be identified by specific names for convenience of expression but they are intended to be as generic in their application to similar parts as the art will permit.

In the drawings there is shown a stocking of conventional outline including a foot 10, a main leg portion 11 and a two-ply garter top band 12 with its lower edge permanently secured to the upper edge of the main leg portion. The major portion of the stocking is formed of a single layer of silk; and the inner ply of the band is continuous with the main portion 11, and likewise is formed of silk which extends over the edge 13 for a short distance down the outer ply to the line of demarkation 14. Between the line 14 and the single layer silk leg portion 11 of the stocking the outer ply is formed of a heavier weight of material than is used in the major portion of the stocking to form a relatively bulky outer band 15. This outer band in the present disclosure is formed of cotton.

When the top of the stocking is turned down and inwardly to form the roll 16 or is simply turned down without rolling, the inner silk side of the band forms the outside of the roll or top so that the top portion has the same silky appearance as the balance of the stocking, as shown in Fig. 2 the stocking looks like an all-silk stocking. The cotton layer exposed in Fig. 1 provides the necessary bulk of material to form the roll and the cotton is hid within the roll and is not exposed when enclosed as shown in Fig. 2.

It is within the scope of the disclosure to enclose the garter either within the roll or within the turn over top as the case may be.

The construction illustrated features economy in manufacturing cost for the portion of the stocking which is hidden within the roll or back of the turn-down top can be made of a material cheaper than the silk which would otherwise have to be used to provide a silk appearing stocking and where the user desired to form a roll top stocking a much neater roll is provided than would be possible if the roll was all silk. The cotton or similar heavy material provides a roll which is substantially circular in cross section and does not flatten out to any material extent as would be the case if the roll was formed entirely of the fine silk used in the major portion of the stocking.

Having thus described my invention, I claim:

1. A stocking formed mainly of silk and having adjacent its top a two-ply band with the inner ply continuous with the leg portion of the stocking, the inner ply being of silk and the outer ply being of cotton, whereby when the open end of the stocking is rolled down the cotton will form the inner side of the roll and be hid within the same and the silk will form the outer side thereby giving the appearance of an all-silk rolled stocking.

2. A stocking including a foot, a main leg portion and a top portion, having its lower edge permanently secured to the upper edge of said main leg portion and said top portion including an outer and an inner ply, the outer ply being formed of a relatively bulky material and the inner ply being formed of a relatively fine material, the open end of said top portion adapted to be rolled down towards the main leg portion with the bulky material forming the inside of the roll and hid thereby and the exposed outside of the roll formed by the fine material.

3. A stocking formed mainly of silk and having adjacent its top a two ply band with one of the plies continuous with the leg portion of the stocking, the greater portion of the inner ply being of silk and the outer ply being of cotton, whereby when the open end of the stocking is turned down the cotton will form the inner side of the flap and be hid within the same and the silk will form the outer side thereby giving the appearance of an all silk stocking.

4. A stocking, a main leg portion and a top portion having its lower edge permanently secured to the upper edge of said main leg portion and said top portion including an outer and an inner ply, the outside ply being formed of a relatively bulky material and the inner ply being formed of a relatively fine material, the open end of said top portion adapted to be turned downwardly over the main leg portion to form a flap with the bulky material forming the inside of the flap and hid thereby and the exposed outside of the flap formed by the fine material.

5. A stocking comprising a silk leg portion, a two ply closed band constituting a welt permanently secured along its lower edge to the upper edge of the silk leg portion, the inner ply adjacent the edge opposite the leg portion being formed of silk, and the outer ply of said band being formed of cotton for the major portion of its height.

6. A stocking formed mainly of silk and having adjacent its top a two ply band, the greater portion of the inner ply being of silk and the outer ply being of cotton, whereby when the open end of the stocking is turned down the cotton will form the inner side of the flap and be hid within the same and the silk will form the outer side thereof giving the appearance of an all silk stocking.

Signed at Milwaukee, in the county of Milwaukee, and State of Wisconsin, this 18th day of March 1926.

JOHN E. FITZGIBBON.